April 24, 1934.  H. W. McCREARY  1,956,358
ANIMAL TRAP
Filed May 29, 1933

INVENTOR
Harry W. McCreary
BY
Louis Prevost Whittaker
ATTORNEY

Patented Apr. 24, 1934

1,956,358

UNITED STATES PATENT OFFICE 1,956,358

ANIMAL TRAP

Harry W. McCreary, Lititz, Pa., assignor to Animal Trap Company of America, Lititz, Pa., a corporation of Pennsylvania Application May 29, 1933, Serial No. 673,357

5 Claims. (Cl. 43—83)

My invention consists in the novel features hereinafter described, reference being had to the accompanying drawing which illustrates one embodiment of the same selected by me for purposes of illustration, and the said invention is fully disclosed in the following description and claims.

My invention is an improvement in animal traps of the kind in which a pivotally mounted locking bar is provided for holding the jaw of the trap in set position. Such locking bars are ordinarily provided with a detent portion for engaging the jaw and a setting shoulder below said detent, and extending rearwardly (or forwardly) of the pivotal connection, and arranged in the path of the jaw when moved into setting position, for the purpose of rocking the locking bar on its pivotal connection to facilitate the setting of the trap automatically. Traps of this general type are usually made for catching mice and rats and are sold at an extremely low price, and my invention has for its object to provide a more efficient locking bar, and at the same time to simplify its construction and facilitate its assembly with the other parts of the trap, and thereby reduce the manufacturing costs thereof.

In the accompanying drawing I have illustrated an embodiment of my invention in an automatic or self setting trap in which the bait pedal is counterweighted, but it is to be understood that my invention is applicable to other forms of automatic or semi-automatic traps, in which a pivotally mounted locking bar for the purposes mentioned is employed.

Referring to the accompanying drawing.

Figure 1:
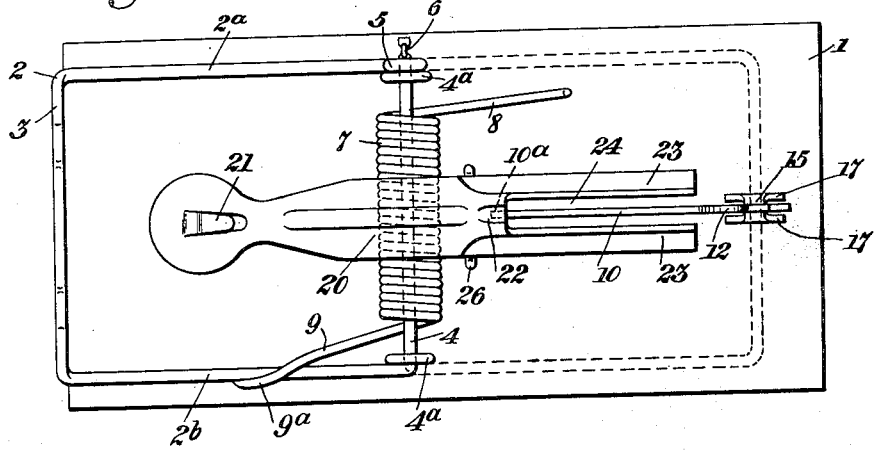
Fig. 1 is a plan view of a self-setting trap having my invention embodied therein, showing it in sprung position.

In the drawing, 1, represents the base of the trap, which in this instance is made of wood. 2 represents the pivoted jaw, which comprises in this instance the side arms, 2a, 2b, connected by the crossbar or striker, 3, which is integral therewith. One of the arms, in this instance, arm 2b, is provided with a pivot shaft, indicated at 4, integral therewith, and having a portion, 6, extending through an eye, 5, at the inner end of the arm, 2a, and upset as shown, or otherwise provided with an enlargement to prevent its disengagement from the eye, 5. 7 indicates a helical spring for the jaw through which the pivot shaft, 4, extends, the spring being provided at one end with an arm, 8, engaging the base, 1, and at the other end with an arm, 9, having a hook portion, 9a, engaging one of the arms of the jaw, in this instance the arm, 2b. The jaw is pivotally connected to the base by means of staples, indicated at 4a, engaging the pivot shaft, 4, adjacent to the arms, 2a and 2b.

Figure 2:
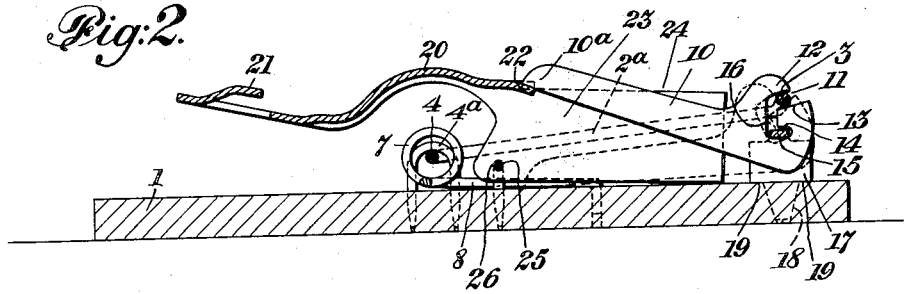
Fig. 2 is a central vertical longitudinal section of the same, showing it in set position.

10 represents the locking bar, which may be conveniently stamped or otherwise formed from sheet metal of the required thickness and strength. This bar is provided with a wider portion adjacent to its rear end, in which there is formed a slot, 11, at the upper edge of which is a detent, 12, adapted to be engaged by the crossbar or striker, 3, in the set position, as indicated in Fig. 2. At the lower side of the slot or recess, 11, is a setting shoulder, indicated at 13, extending rearwardly beyond the detent, 12, and adapted to be engaged by the striker, 3, in setting the trap. The rear end portion of the locking bar is provided with a pivotal aperture, indicated at 14, below the recess, 11, and preferably having greater extent in a direction substantially longitudinally of the locking bar than transversely thereof, to accommodate a pivotal supporting member, indicated at 15, which is approximately oblong in cross section. This portion of the locking bar is also provided with a vertically disposed slot, indicated at 16, which connects the notch or recess, 11, with the pivotal aperture, 14, at or adjacent to the forward end of said aperture, as clearly shown in Fig. 2.

Figure 3:
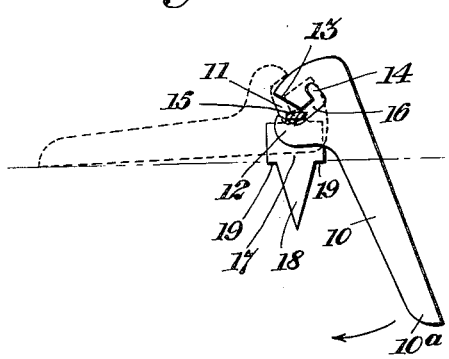
Fig. 3 is a detail view illustrating the method of assembling the locking bar with its pivotal support.
Figure 4:
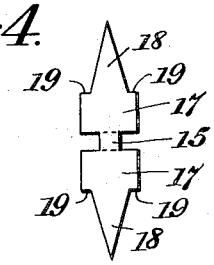
Fig. 4 is a detail view of the blank for a staple which preferably provides the pivotal support for the locking bar.

The pivotal supporting member, 15, may be provided in many ways, but is preferably formed as an integral part of a staple, which is driven into or otherwise secured to the base, 1. I prefer to employ for this purpose, a staple constructed as indicated in the drawing, the blank for which is illustrated in Fig. 4. As therein shown, the staple comprises two rectangular plates, 17, 17, each provided with a clinching point or tang, 18, terminating at its inner end in shoulders, 19, for engaging the upper face of the base, 1, and limiting the extent to which the points, 18, may be driven into the base. The plates, 17, 17, are connected by a narrow part, oblong in cross section, which forms the previously described pivotal support for the locking bar. The staple is completed by bending the side plates, 17, 17, into parallelism, as best shown in Fig. 1, preparatory to assembling the pivotal support, 15, with respect to the locking bar, in the manner indicated in Fig. 3. This assembly is performed before the staple is operatively connected with the base, and it will be seen from Fig. 3, that by placing the parts in the position therein shown, the pivotal support, 15, can be introduced through the notch or recess, 11, thence through the connecting slot, 16, to the pivotal aperture, 14, by swinging the locking bar with respect to the staple, in the direction indicated by the arrow in Fig. 3. When these parts have been assembled, the points, 18, of the staple are forced into the base so as to bring the pivotal support, 15, at the proper distance from the pivot shaft, 4, of the jaw, and the points may be clinched in the usual manner. It will be seen that the parallel plates, 17, of the staple tend to act as guides to hold the locking bar at substantially right angles to the pivotal support, 15.

In the trap here shown, 20, represents the bait pedal provided with a bait holding portion, 21, a trigger portion, 22, for engaging the forward end of the locking bar, and the bait pedal is provided at its rear end, with downwardly extending wings, 23, forming an open slot, 24, between them. The bait pedal is pivotally connected with the base, preferably at a point in rear of the pivotal shaft, 4, and in this instance the wings, 23, are shown as provided with pivotal apertures, one of which is indicated at 25, which are engaged by a staple, indicated at 26, which is driven into the base.

The normal position of the locking bar is shown in dotted lines in Fig. 2.

It will be seen that the shoulder, 13, of the locking bar extends rearwardly of the pivotal support, 15, and in order to set the trap it is only necessary to swing the jaw, 2, through approximately 180°, which will bring it into engagement with the shoulder, 13, and thereby tilt the locking bar into the position shown in Fig. 2, so as to bring the forward end, 10a, thereof above the trigger portion, 22, of the bait pedal, and at the same time carry the detent, 12, above the position occupied by the crossbar or striker, 3. On releasing the jaw, the crossbar, 3, will engage the detent, 12, and exert upward pressure thereon, thus causing the forward end, 10a, to bear downwardly on the trigger, 22. Any downward movement of the forward end of the bait pedal, as by an animal endeavoring to secure the bait, will rock the bait pedal and release the forward end of the locking bar when the upward pressure of the crossbar, 3, on the detent, 12, will rock the locking bar on its pivotal support, 15, into its normal position, indicated in dotted lines in Fig. 2, and thereby release the jaw, which returns to its normal position and strikes the animal.

By forming the notch, 11, the connecting slot and the pivotal aperture, 14, in the manner described, the construction of the locking bar is simplified and the assembly of the locking bar with its pivotal support is greatly facilitated, while at the same time the accidental disengagement of the locking bar from its pivotal support is positively prevented as soon as the staple forming part of the pivotal support has been secured in position with respect to the base. The engagement of the longitudinal elongated pivotal aperture, 14, with the correspondingly shaped substantially pivotal support, renders it impossible to raise the forward end of the locking bar very much above the position which it occupies when in engagement with the trigger, 22, and the locking bar cannot be swung downwardly below the upper face of the base, and therefore cannot be accidentally disconnected from the pivotal support, 15.

It will also be seen that the provision of the connecting slot extending upwardly from the pivotal aperture to the inner end of the notch or recess leaves the bar otherwise unperforated, and therefore stronger than would be the case if a connecting slot extended downwardly or laterally to the edge of the metal.

What I claim and desire to secure by Letters Patent is:

1. In a trap, the combination with a base, a pivoted spring actuated jaw, and a bait pedal provided with a trigger portion, of a locking bar provided with a trigger engaging portion and a jaw engaging detent, and a jaw engaging setting shoulder separated from said jaw engaging detent by a recess and further provided with a pivotal aperture, and a slot connecting said aperture with said recess, and a pivotal support connected with said base and engaging said pivotal aperture, said slot providing a passage for said pivotal support in assembling said bar therewith.

2. In a trap, the combination with a base, a pivoted spring actuated jaw, and a bait pedal provided with a trigger portion, of a locking bar provided with a trigger engaging portion and a jaw engaging detent, and a jaw engaging setting shoulder separated from said jaw engaging detent by a recess and further provided with a pivotal aperture of unequal diameters, having its greater diameter extending substantially longitudinally of said bar, and having a substantially vertically disposed slot of a width substantially equal to the lesser diameter of the pivotal aperture, connecting said aperture with said recess, and a pivotal support having unequal diameters connected with said base and engaging said pivotal aperture, said slot providing a passage for said pivotal support in assembling said bar therewith.

3. In a trap, the combination with a base, a pivoted spring actuated jaw, and a bait pedal provided with a trigger portion, of a locking bar provided with a trigger engaging portion and a jaw engaging detent, and a jaw engaging setting shoulder separated from said jaw engaging detent by a recess and further provided with a pivotal aperture of unequal diameters, having its greatest diameter extending substantially longitudinally of the bar, and having a subsbtantially vertical slot of a width substantially equal to the lesser diameter of said pivotal aperture, connecting the forward end of said aperture with the inner end of said recess, and a pivotal support connected to said base and engaging said pivotal aperture, said pivotal support having unequal diameters, the greater diameter thereof being disposed substantially parallel with the adjacent surface of the base, said slot providing a passage for said pivotal support in assembling said bar therewith.

4. A locking bar for an animal trap, comprising a flat metal bar provided adjacent to one end with a trigger engaging portion and adjacent to the other end with a detent, a setting shoulder separated from said detent by a recess, and a pivotal aperture elongated substantially longitudinally of said bar, and connected at one end with the inner portion of said recess by a slot extending substantially transversely of said bar, said slot permitting insertion of a pivot transversely thereof and longitudinally of said slot into said pivotal aperture.

5. In a trap, the combination with a base, a pivoted spring actuated jaw, and a bait pedal, of a locking bar provided with a pivotal aperture elongated substantially longitudinally of said bar, said bar having a jaw engaging detent located above said pivotal aperture, and having a recess below said detent extending to an edge portion of said bar, and a vertically disposed slot of less width than the length of said pivotal aperture connecting said pivotal aperture adjacent to one end of the same with the inner end of said recess, and a pivotal support connected with the base and engaging said pivotal aperture, said slot providing a passage for said pivotal support from said recess to the pivotal aperture in assembling said bar therewith.

HARRY W. McCREARY.